United States Patent [19]

Schmidt

[11] Patent Number: 4,795,545
[45] Date of Patent: Jan. 3, 1989

[54] PROCESS FOR PRETREATMENT OF LIGHT HYDROCARBONS TO REMOVE SULFUR, WATER, AND OXYGEN-CONTAINING COMPOUNDS

[75] Inventor: Robert J. Schmidt, Rolling Meadows, Ill.

[73] Assignee: UOP Inc., Des Plaines, Ill.

[21] Appl. No.: 97,972

[22] Filed: Sep. 17, 1987

[51] Int. Cl.<sup>4</sup> .............................................. C10G 25/05
[52] U.S. Cl. ...................... 208/91; 208/177; 208/178; 208/188; 208/208 R; 208/245; 208/248; 208/310 Z; 585/737; 585/822; 585/823
[58] Field of Search ............ 585/822, 823, 737; 208/91, 177, 188, 208 R, 245, 248, 310 Z

[56] References Cited

U.S. PATENT DOCUMENTS

| | | | |
|---|---|---|---|
| 2,325,115 | 7/1943 | Egloff | 208/248 |
| 3,007,980 | 6/1958 | Barton et al. | 585/822 |
| 3,051,646 | 8/1962 | Brooke | 585/823 |
| 3,098,814 | 9/1959 | Epperly | 585/822 |
| 3,278,624 | 10/1966 | Thomas, Jr. | 585/823 |
| 3,306,945 | 2/1967 | Conviser | 585/823 |
| 3,445,542 | 5/1969 | Bunn et al. | 585/737 |
| 3,931,350 | 1/1976 | Sparks | 260/671 B |
| 4,098,684 | 7/1978 | Innes | 208/245 |
| 4,313,821 | 2/1982 | Garwood et al. | 208/245 |
| 4,374,654 | 2/1983 | McCoy | 55/71 |
| 4,540,842 | 10/1985 | Allen | 585/822 |

Primary Examiner—Patrick P. Garvin
Assistant Examiner—George R. Fourson
Attorney, Agent, or Firm—Thomas K. McBride; John F. Spears, Jr.; David M. Frischkorn

[57] ABSTRACT

A pretreatment process for removal of contaminants from a light hydrocarbon feedstock is presented. The feedstock is passed to a first adsorption zone containing a molecular sieve and thereafter passed to a second adsorption zone containing activated alumina. The process produces a hydrocarbon feedstock substantially free of sulfur compounds, oxygenates, and water. Such a process finds utility as a feed pretreatment step preceding a catalytic isomerization process.

1 Claim, 1 Drawing Sheet

Figure 1
*Feed Stock Sulfur Compound Prior To Treatment.*
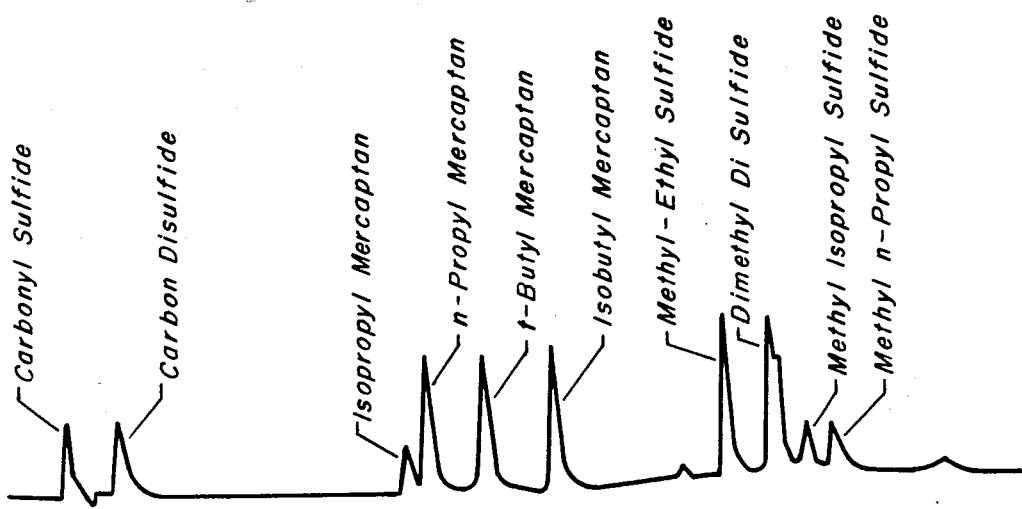
*Sulfur Compounds In Effluent After Treatment.*
Figure 2

PROCESS FOR PRETREATMENT OF LIGHT HYDROCARBONS TO REMOVE SULFUR, WATER, AND OXYGEN-CONTAINING COMPOUNDS

BACKGROUND OF THE INVENTION

This invention relates to a process for the pretreatment of light hydrocarbons to remove sulfur, water and oxygen-containing compounds. More specifically, the invention concerns subjecting a light hydrocarbon feed containing $C_4$-$C_8$ hydrocarbons to a first adsorption zone comprising a molecular sieve and then to a second adsorption zone comprising an activated alumina. The invention finds utility as a pretreatment process for a light hydrocarbon isomerization process.

INFORMATION DISCLOSURE

The removal of sulfur compounds, water, and oxygenates from light hydrocarbons is desirable for many reasons, depending in part upon the intended use of the final clean product. In many instances, the light hydrocarbons are further processed in catalytic reactions, such as isomerization, to produce other hydrocarbons, increase octane, or simply to improve the product value. It is well known that processes utilizing catalyst composites are very sensitive to contaminants such as sulfur, water, and oxygenates. These contaminants cause deactivation or fouling of the catalyst which in turn results in reduced catalyst life, increasing the number of catalyst regenerations or in some instances complete replacement of the catalyst.

There has developed a body of art directed to removal of contaminants from hydrocarbon streams utilizing various sorbents, including zeolites, aluminas, carbons, and molecular sieves. For example, U.S. Pat. No. 4,098,684 discloses a process for removal of only sulfur compounds from a paraffin-containing feedstock utilizing two different adsorbent materials in the adsorption zone. The first material comprises a zeolitic molecular sieve and the second comprises zeolite A. No mention is made of the removal of either water or oxygenates. It is taught in U.S. Pat. No. 3,931,350 that oxygen-containing compounds can be selectively removed from an n-paraffin feedstock by employing either a liquid or solid sorbent. This reference is not cognizant of the utility of employing two adsorption zones nor does it teach the removal of water or sulfur compounds.

Two references which teach multi-stage removal of undesirable elements from hydrocarbon feedstocks are U.S. Pat. Nos. 4,313,821 and 4,374,654. The '821 patent is directed to removal of asphaltenes, carbenes and carboids which contain metals, nitrogen, sulfur, and oxygen from liquid organic liquid obtained from the "Solvent Refined Coal" process. Contaminant removal occurs by a first contact with an ion exchange resin preceded by a second contact with a zeolite. In the '654 patent, a two-stage low temperature adsorptive separation process is employed for removing HCl and $H_2S$ from a reformer off-gas. The first stage uses a molecular sieve to adsorb HCl and in the second stage, zinc oxide is used to remove $H_2S$.

While the above-noted prior art is considered of interest in connection with the subject matter of the present invention, the unique combination of adsorption zones has not, insofar as is known, been previously described.

SUMMARY OF THE INVENTION

The present invention is a two-stage feed pretreatment process for eliminating undesirable elements such as sulfur compounds, water, and oxygenates from hydrocarbon feedstocks which eventually are utilized in hydrocarbon conversion processes. These feedstocks comprise from 4 to 8 carbon atoms per molecule. Specifically, the pretreatment process involves the following steps: passing the feedstock to a first adsorption zone comprising a molecular sieve; thereafter passing the effluent from the first adsorption zone through a second adsorption zone comprising activated alumina; and recovering the effluent from the second adsorption zone substantially free of sulfur compounds, oxygenates, and water.

More specifically, the invention is directed to a pretreatment process for a light hydrocarbon conversion process wherein the feedstock is a light naphtha comprising paraffinic hydrocarbons having from 4 to 6 carbon atoms per molecule. The use of the invention may totally eliminate the need for conventional hydrotreating of the feedstock and thereby greatly reduce both capital and operating costs.

DETAILED DESCRIPTION OF THE INVENTION

To reiterate, the invention provides a pretreatment process for feedstocks eventually being used in hydrocarbon conversion processes. Elimination of undesirable elements such as sulfur compounds, oxygenates, and water from feedstocks comprising $C_4$-$C_8$ hydrocarbons is accomplished in a process comprising two adsorption zones. The first zone contains a molecular sieve for removal of water and sulfur compounds, except carbon disulfides, and the second zone contains activated alumina for removal of the carbon disulfides and oxygenates. Of these undesirable elements, it has now been found that elimination of these undesirable elements by this unique combination of adsorption zones results in improved performance of the hydrocarbon conversion process using the treated feedstock. The feedstocks to be treated by the process of the instant invention comprise light hydrocarbons having from 4 to 8 carbon atoms per molecule, including acyclic paraffins and cyclic naphthenes. Also included are straight or partially branched chain paraffins such as normal butane, normal pentane, normal hexane, normal heptane, normal octane, 2-methylpentane, 3-methylpentane, 3-ethylpentane, etc. In addition, low levels of aromatic species may also be present, such as, benzene and toluene. Cycloparaffins may also be present in the feedstock such as alkylcyclopentanes, cyclohexanes, methylcyclopentane, dimethylcyclopentane, cyclohexane, methylcyclohexane, dimethylcyclohexane, etc. The feedstock may be comprised of mixtures of paraffins and/or naphthenes, including those derived from selective fractional distillation of natural gasolines and naphthas. A preferred type of feedstock is light naphtha comprising paraffinic hydrocarbons having from 4 to 6 carbon atoms per molecule.

As the instant invention is directed to removal of undesirble elements from the feedstock, it necessarily follows that the feedstock has measurable quantities of contaminants. Such contaminants include sulfur compounds, water, and/or oxygenates. The term "sulfur compounds" is used to mean any compound containing sulfur in whatever form, elemental or combined, it may be present. Examples include hydrogen sulfide, mercaptans, carbonyl sulfide, and carbon disulfide. Sulfur compounds may be present in the feedstock in amounts ranging from about 0.5 to about 300 wt. ppm, calculated as elemental sulfur. Water and its precursors may also be present in the feedstock in amounts from 5 to 250 wt. ppm, measured as $H_2O$. The contaminants may also be oxygenated hydrocarbon compounds, otherwise known as oxygenates, such as alcohols, ethers, ketones, and acids. Specific examples of these oxygenates are ethanol, methanol, tertiary butyl alcohol, dimethyl ether, and methyl tertiary butyl ether. Typically, the level of oxygenates in the feedstock ranges from about 0.1 to about 10,000 wt. ppm. The instant invention is also quite capable of removing from the feedstock oxygencontaining species such as carbon dioxide. The feedstock may or may not have been subject to a conventional hydrotreating process prior to its use in the pretreating process of the instant invention.

In accordance with the invention, the feedstock is subjected to a first adsorption comprising a molecular sieve. As used here, the term "molecular sieve" is defined as a class of adsorptive desiccants which are highly crystalline in nature, distinct from amorphous materials such as gamma-alumina. Preferred types of molecular sieves within this class of crystalline absorbents are aluminosilicate materials commonly known as zeolites.

The term "zeolite" in general refers to a group of naturally occurring and synthetic hydrated metal aluminosilicates, many of which are crystalline in structure. There are, however, significant differences between the various synthetic and natural materials in chemical composition, crystal structure and physical properties such as X-ray powder diffraction patterns.

The structure of crystalline zeolitic molecular sieves may be described as an open three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, for example, alkali metal and alkaline earth metal ions such as sodium, potassium, calcium, and magnesium ions. One cation may be exchanged for another by ion exchange techniques.

The zeolites may be activated by driving off substantially all of the water of hydration. The space remaining in the crystals after activation is available for adsorption of absorbate molecules. Any of this space not occupied by reduced elemental metal atoms will be available for adsorption of molecules having a size, shape, and energy which permits entry of the adsorbate molecules into the pores of the molecular sieves.

The zeolites occur as agglomerates of fine crystals or are synthesized as fine powders and are preferably tableted or pelletized for large-scale adsorption uses. Pelletizing methods are known which are very satisfactory because the sorptive character of the zeolite, both with regard to selectivity and capacity, remains essentially unchanged.

The pore size of the zeolitic molecular sieves may be varied by employing different metal cations. For example, sodium zeolite A has an apparent pore size of about 4 angstrom units, whereas calcium zeolite A has an apparent pore size of about 5 angstrom units.

Type 13X sieves are employed in the first adsorbent bed. The general chemical formula for a molecular sieve composition known commercially as type 13X is:

$$0.83\pm0.05Na_2O1.00Al_2O_32.48\pm0.038SiO_2$$

plus water of hydration. Type 13X has a cubic crystal structure which is characterized by a threedimensional network with mutually connected intra-crystalline voids accessible through pore openings which will admit molecules with critical dimensions up to 10 angstroms. The void volume is 51 vol.% of the zeolite and all adsorption takes place in the crystalline voids.

The first adsorption zone removes any water present in the feedstock and removes any sulfur compounds present, however, carbon disulfide is not adsorbed to any appreciable extent. Similarly, light oxygen-containing compounds such as $CO_2$ are not appreciably removed by the first adsorption zone.

The effluent from the first adsorption zone is passed to a second adsorption zone comprising activated alumina. It has been discovered that the use of this second adsorption zone solves the problem created by the inability of the first adsorption zone to effectively remove the carbon disulfide and light oxygen-containing compounds. The activated alumina used in the second adsorption zone is a highly porous, high surface area alumina oxide comprising greater than 90 wt.%, volatile-free basis, of $Al_2O_3$. Activated alumina is obtained from various hydrated forms of alumina by controlled heating to eliminate the water of constitution. Heating usually is performed very rapidly at a temperature between 400° and 800° C. in flowing air or other gas, producing an alumina showing an amorphous X-ray diffraction phase of chi and gamma forms and losing about 5 wt.% volatiles on ignition at temperatures from 250°–1200° C. The activated alumina also contains minor amounts—less than 1 wt.%—of $SiO_2$, $Na_2O$, and $Fe_2O_3$ and has a bulk density ranging from 0.5 to 0.9 g/cc. Total surface area of the activated alumina may range from 200 to 500 $m^2/g$, with a total of from 0.20 to 0.75 cc/g. Most preferred properties include a surface area of about 325 $m^2/g$, total pore volume of about 0.5 cc/g, and a bulk density of about 0.75 g/cc.

The activated alumina may also contain a modifier compound to enhance its efficiency for removal of sulfur compounds, especially carbon disulfide. A preferred class of modifiers include the Group 1A alkali metals, which include lithium, sodium, potassium, rubidium, and cesium. Sodium is the most preferred modifier. The activated alumina may contain up to 10 wt.% of the modifier, preferably from 1 to 5 wt.%, volatile-free basis. Although the effectiveness of the activated alumina is not dependent on the shape of the material, useful shapes include spheres and cylinders in sizes on the order of 1/16- to ¼-inch in diameter.

The quantity of the contaminant in the effluent from the second adsorption zone is dependent on the nature and quantity of contaminant in the feedstock introduced into the first adsorption zone. Also, the length of time that the pretreatment process has been in service will affect the efficiency of contaminant removal. At the time the pretreatment process is first brought on-stream, the effluent from the second adsorption zone is substantially free of sulfur compounds, oxygenates, and water. Preferably, this effluent will contain less than 1 wt. ppm of sulfur, oxygenates, and water.

The required adsorption conditions for both zones will depend on such factors as the quantity of adsorbents utilized and the contaminants to be removed from the feedstock. A general range of suitable adsorption conditions includes a superatmospheric pressure less than about 3448 kPa (ga), although higher pressures may be employed, and a temperature less than about 150° C. A liquid hourly space velocity of less than 10 $hr^{-1}$ should be employed. A preferred range of adsorption conditions suitable for both zones includes a pressure from 101 to 1379 kPa (ga), a temperature between 25° and 100° C., and a space velocity of from 1 to 5 volumes of feedstock per hour per volume of adsorption zone.

Feedstock is passed to the pretreatment process continually until it is evident that the capacity of either or both adsorbents has been reached. The appearance of significant quantities of contaminants in the effluent from the second adsorption zone is an indication that capacity has been reached. At such time, it becomes necessary to desorb or regenerate the adsorption zones. Prior to the regeneration step, the feedstock is switched from the two adsorption zones requiring regeneration to two adsorption zones which are freshly regenerated. Regeneration is performed by passing a hot, substantially non-adsorbable purge gas through the zones at a temperature between 175° and 315° C. Suitable purge gases include natural gas, methane, hydrogen, nitrogen, and carbon monoxide. It is also possible to perform the regeneration with a non-adsorbable liquid hydrocarbon or hydrocarbon mixture. For example, when the instant invention is employed as a pretreatment process in the isomerization of light hydrocarbons, a slip stream from a stabilizer column bottoms, comprising pentanes and hexanes, may be used.

As mentioned, the instant invention is preferably utilized as a feedstock pretreatment process preceding a hydrocarbon conversion process. The term "hydrocarbon conversion" is intended to include all reactions wherein hydrocarbons change physical or chemical composition. A preferred hydrocarbon conversion process is the catalytic isomerization of light hydrocarbons. Included in the group of light hydrocarbons are saturated hydrocarbons, more particularly straight chain or slightly branched chain paraffins containing four or more carbon atoms per molecule. The isomerization reaction can be conducted over a wide range of temperatures but in general, in the range from about 93° to about 427° C. Space velocities from about 0.25 to about 5 liquid volumes per hour of said isomerizable hydrocarbons per volume of said catalytic composite are preferred with reaction zone pressures preferably within the range from about 690 to about 6900 kPa (ga). Further details regarding isomerization of light naphtha hydrocarbons can be found in U.S. Pat. No. 4,665,272, the teachings of which are incorporated herein by reference. It is particularly desirable to carry out the isomerization reaction in the presence of hydrogen preferably in the range from about 0.05 to about 5 moles of $H_2$ per mole of isomerizable hydrocarbon. The function of the hydrogen is primarily to improve catalyst life, apparently by preventing polymerization of intermediate reaction products which would otherwise polymerize and deposit on the catalytic composite. It is not necessary to employ pure hydrogen since hydrogen-containing gases are suitable. Product separation facilities of the isomerization process or other processes such as catalytic conversion of naphthas are suitable sources of $H_2$-rich gases typically contain light hydrocarbons, $C_1$-$C_3$, and may also contain other compounds including sulfur.

The instant invention will be further described with reference to the following experimental work. The following example is presented for purposes of illustration only and is not intended to limit the scope of the present invention.

BRIEF DESCRIPTION OF THE DRAWING

FIGS. 1 and 2 are reproductions of chromatographic analysis results which semiqualitatively illustrate the sulfur species present in two hydrocarbon samples.

FIG. 1 illustrates the various sulfur species contained in an untreated light naphtha feedstock.

FIG. 2 illustrates the sulfur species contained in the light naphtha feedstock after treatment with a molecular sieve.

EXAMPLE

An untreated feedstock comprising a mixture of substantially $C_5$ and $C_6$ paraffinic hydrocarbons containing about 158 ppm of sulfur compounds, measured as elemental sulfur, was contacted in an adsorption zone comprising 13X molecular sieve. The adsorption zone process conditions included a temperature of about 25° C., a pressure of about 2413 kPa (ga), and a liquid hourly space velocity of about 1.0 $hr^{-1}$.

FIG. 1 graphically illustrates the various sulfur species in the untreated feedstock. FIG. 2 graphically illustrates the sulfur species present in the effluent. It is noted that substantially all sulfur species are removed except for carbonyl disulfide which resulted in a total sulfur concentration of about 6 wt. ppm.

To a second feedstock comprising substantially $C_5$ and $C_6$ paraffinic hydrocarbon was added approximately 20 wt. ppm of carbon disulfide. This feedstock, representative of an effluent from a first adsorption zone comprising 13X molecular sieve, was passed to an adsorption zone comprising activated alumina. The adsorption zone process conditions included a temperature of about 175° C., a pressure of about 2413 kPa (ga), and a liquid hourly space velocity of 1.0. Sulfur analysis of the effluent from this adsorption zone showed less than 1 wt. ppm of carbon disulfide.

What is claimed is:

1. A catalytic isomerization process in which a feed stream comprising paraffins having from 4 to 6 carbon atoms per molecule and substantially free of sulfur compounds, oxygenates and water is isomerized in a reaction zone in the presence of an isomerization catalyst at isomerization conditions to produce a product having increased octane value compared to the feed, said feed stream having previously been subjected to a pretreatment process which comprises:
  (a) passing a hydrocarbon stream comprising paraffins having 4 to 6 carbon atoms per molecule, mercaptans, carbon disulfide, carbonyl sulfide, oxygenates and water through a first adsorption zone comprising 13X zeolite maintained at a temperature of 25° to 100° C., a pressure less than 3448 kPa (ga), and a space velocity of from 1 to 5 volumes per hour per volume of first adsorption zone;
  (b) thereafter passing the effluent from the first adsorption zone through a second adsorption zone comprising activated alumina maintained at a temperature of from 25° to 100° C., a pressure less than 3448 kPa (ga), and a space velocity of from 1 to 5 volumes of feedstock per hour per volume of second adsorption zone; and
  (c) recovering the effluent from the second adsorption zone with the effluent containing less than 1 wt. ppm carbon disulfide.

* * * * *